(12) United States Patent
Allen, Jr. et al.

(10) Patent No.: US 7,051,250 B1
(45) Date of Patent: May 23, 2006

(54) ROUTING WORKPIECES BASED UPON DETECTING A FAULT

(75) Inventors: Sam H. Allen, Jr., New Braunfels, TX (US); Michael R. Conboy, Austin, TX (US); Michael L. Miller, Cedar Park, TX (US); Elfido Coss, Jr., Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 422 days.

(21) Appl. No.: 10/164,091

(22) Filed: Jun. 6, 2002

(51) Int. Cl.
*G06F 11/00* (2006.01)
(52) U.S. Cl. ........................ 714/708; 714/13
(58) Field of Classification Search ................ 714/704, 714/708, 724, 10, 13, 15, 16, 25, 31, 33, 714/335, 57, 44, 46
See application file for complete search history.

(56) References Cited

U.S. PATENT DOCUMENTS

| | | | | |
|---|---|---|---|---|
| 5,720,031 A | * | 2/1998 | Lindsay | 714/42 |
| 6,467,049 B1 | * | 10/2002 | Robins et al. | 714/13 |
| 6,625,753 B1 | * | 9/2003 | Skogman et al. | 714/13 |

* cited by examiner

*Primary Examiner*—Christine T. Tu
(74) *Attorney, Agent, or Firm*—Williams, Morgan & Amerson, P.C.

(57) ABSTRACT

A method and apparatus is provided for routing workpieces based upon detecting a fault. The method comprises routing a workpiece to a first processing tool identified by a dispatch system, detecting a fault condition associated with the first processing tool and notifying the dispatch system of the detected fault condition. The method further comprises routing a second workpiece to a second processing tool in response to the dispatch system being notified of the fault condition.

22 Claims, 3 Drawing Sheets

ROUTING WORKPIECES BASED UPON DETECTING A FAULT

BACKGROUND OF THE INVENTION

1. Field of the Invention

This invention relates generally to a semiconductor fabrication process, and, more particularly, to routing workpieces in the semiconductor fabrication process based upon detecting a fault.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in continual improvements in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

During the fabrication process, various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled, in accordance with performance models, to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Semiconductor manufacturing processes, which have become more reliable and robust over the past few years, may include a plurality of processing tools that cooperate with each other to process semiconductor devices, such as microprocessors, memory devices, ASICs, etc. To verify that the processing tools are operating within acceptable parameters, it has become increasingly desirable to monitor the operating conditions of such processing tools.

Today's semiconductor manufacturing processes may include an intricate network of multiple processing tools for manufacturing semiconductor devices. While numerous benefits arise from linking multiple processing tools, there can, however, be some drawbacks, particularly from the standpoint of processing downtime should one or more of the processing tools malfunction. The manufacturing process may be halted, or at least adversely affected, during this downtime until potential corrective actions can be taken. An undesirably long interruption in the manufacturing process may result in a potential increase in costs for the manufacturer and consumer.

The present invention is directed to overcoming, or at least reducing the effects of, one or more of the problems set forth above.

SUMMARY OF THE INVENTION

In one embodiment of the present invention, a method is provided for routing workpieces based upon detecting a fault. The method comprises routing a first workpiece to a first processing tool identified by a dispatch system, detecting a fault condition associated with the first processing tool and notifying the dispatch system of the detected fault condition. The method further comprises routing a second workpiece to a second processing tool in response to the dispatch system being notified of the fault condition.

In another embodiment of the present invention a dispatch system is provided for routing workpieces based upon detecting a fault. The dispatch system comprises an interface and a control unit, which is communicatively coupled to the interface. The control unit is adapted to define a first route for processing a workpiece. The first route includes a first processing tool. The control unit receives a fault notification regarding a fault that is detected with the first processing tool from the interface and defines a second route for processing a next workpiece based on receiving the fault notification. The second route includes a processing tool that is different from the first processing tool. The control unit further routes the next workpiece in accordance with the second route.

In a further embodiment of the present invention, an article comprising one or more machine-readable storage media containing instructions is provided for routing workpieces based upon detecting a fault. The one or more instructions, when executed, enable the processor to detect a fault associated with a processing tool that is adapted to route a workpiece to a first processing tool identified by a dispatch system, detect a fault condition associated with the first processing tool and notify the dispatch system of the detected fault condition. The one or more instructions, when executed, enable the processor to detect a fault associated with a processing tool that is adapted to route a next workpiece to a second processing tool in response to the dispatch system being notified of the fault condition.

BRIEF DESCRIPTION OF THE DRAWINGS

The invention may be understood by reference to the following description taken in conjunction with the accompanying drawings, in which like reference numerals identify like elements, and in which.

Figure 1:
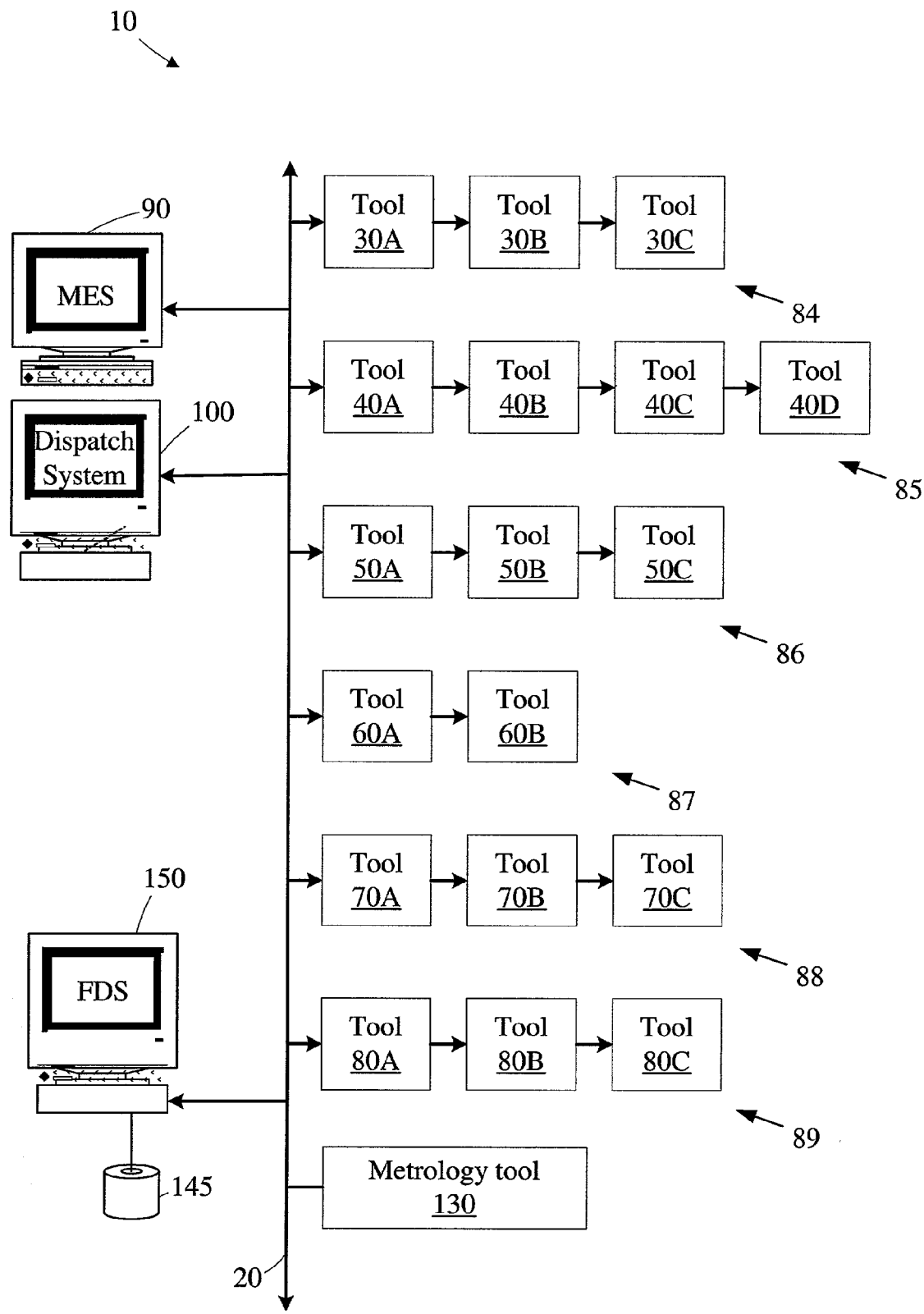
FIG. 1 illustrates a block diagram of a manufacturing system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of an illustrative manufacturing system 10 is provided. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces including, but not limited to, microprocessors, memory devices, digital signal processors, application specific integrated circuits (ASICs), or other similar devices. The techniques may also be applied to workpieces other than semiconductor devices.

A network 20 interconnects various components of the manufacturing system 10, allowing them to exchange information. The illustrative manufacturing system 10 includes a plurality of processing tools 30–80, where each of the processing tools 30–80 may be coupled to a computer (not shown) for interfacing with the network 20. The processing tools 30–80 are grouped into sets 84–89 of like processing tools 30–80, as denoted by lettered suffixes. For example, the first set 84 includes processing tools 30A–30C of a certain type, such as a photolithography stepper. A particular wafer or lot of wafers progresses through the processing tools 30–80 as it is being manufactured, with each processing tool 30–80 performing a specific function in the process flow. Exemplary processing tools 30–80 for a semiconductor device fabrication environment include metrology tools, photolithography steppers, etch tools, deposition tools, polishing tools, rapid thermal processing tools, implantation tools, etc. The processing tools 30–80 are illustrated in a rank and file grouping for illustrative purposes only. In an actual implementation, the processing tools 30–80 may be arranged in any order or grouping. Additionally, the connections between the processing tools 30–80 in a particular grouping are meant to represent only connections to the network 20, rather than only interconnections between the processing tools 30–80.

The manufacturing system 10 includes a manufacturing execution system (MES) 90, which manages and controls the overall operation of the manufacturing system 10. The MES 90 monitors the status of the various entities in the manufacturing system 10 and controls the flow of articles of manufacture (e.g., lots of semiconductor wafers) through the process flow. Generally, the MES 90 defines the process flow at the "set" level (i.e., a particular tool type), as opposed to the "tool" level. That is, the MES 90 typically designates which particular sets 84–89 (or tool types) define the process flow, but does not necessarily specify which particular processing tool 30–80 within the designated sets 84–89 should process the wafers. For example, in one embodiment, the MES 90 may indicate that the process flow should be as follows: a lot of wafers are to be processed by a processing tool 30A–30C from the first set 84, then by a processing tool 40A–40D from the second set 85, next by a processing tool 60A–60B of the fourth set 87, and finally by a processing tool 80A–80C from the sixth set 89.

Once the MES 90 designates the process flow at the "set" level, the MES 90 provides that process flow to a dispatch system 100. The dispatch system 100, in one embodiment, determines the route the lot of wafers takes within the manufacturing system 10 based on the process flow and based on one or more defined business rules. That is, in one embodiment, for each lot of wafers, the dispatch system 100, based on the defined process flow and business rules, determines which particular processing tool 30–80 from its respective set 84–89 is to be utilized for processing the incoming wafers. For example, assuming that the process flow defined by the MES 90 calls for a processing step performed by the processing tools 40A–D of the second set 85, the dispatch system 100, according to predefined business rules, may select a processing tool 40 from the four processing tools 40A–D to process the incoming lot of wafers. The processing tool 40 may be selected based on a variety of business rules, such as the processing speed of that processing tool, the current workload of that processing tool, and the like. By selecting the desired processing tool 30–80 from the desired sets 84–89, the dispatch system 100 defines the route the lots of wafers traverse as they are processed in the manufacturing system 10. As described in more detail below, the dispatch system 100 adjusts the route of the lot of wafers if a fault associated with at least one of the processing tools 30–80 is detected. Re-routing the lot of wafers to avoid the faulty processing tool 30–80 may reduce the overall impact on the process flow in the manufacturing system 10.

In the manufacturing system 10 of FIG. 1, various metrology information from a metrology tool 130 may be collected during the fabrication of the lots. For example, physical measurements, such as transistor gate critical dimensions, particle contamination, process layer thickness, etc. may be collected. Inspection data identifying defects (e.g., particle contamination defects, extra or missing pattern defects, electrical arc damage defects) in the process layers formed on the wafer may also be collected. Direct performance metrology measurements, such as wafer electrical tests (e.g., drive current, effective channel length, dielectric constant) may also be collected. In one embodiment, the metrology data may be stored in a storage unit 145 of a fault detection system (FDS) 150.

The fault detection system 150 is adapted to detect faults associated with one or more of the processing tools 30–80. The faults may be detected in several ways, including based on metrology data provided by the metrology tool 130 or based on the operational data provided by the processing tools 30–80. The fault detection system 150, for example, may detect a fault associated with one or more of the processing tools 30–80 if the received metrology data indicates that values measured from the wafers are outside an acceptable range. The fault detection system 150, in one embodiment, may also detect a fault based on comparing the received operational data from the processing tools 30–80 to fault model data. The fault model data includes operational data of other similar-type tools, where it was previously known that such tools had operated within acceptable operational limits. "Operational data" may include any useful data provided by processing tools 30–80 or by sensors (not shown) associated with these processing tools 30–80.

The types of faults that may be detected by the fault detection system 150 include processing and/or operational faults in fabrication. Examples of processing faults, in the context of semiconductor manufacturing, may include, but are not necessarily limited to, non-optimal preheating of the chamber, catastrophic failure where a broken wafer is detected, abnormal nitrogen (N2) flow rate, temperature overshoots at the top of a ramp, tube temperature measurement drifts, excessive pressures, etc. Examples of operational faults detected by the fault detection system 150 may include, in the context of semiconductor manufacturing, interrupted/resumed processing, or improper wafer sleuth prior to Rapid Thermal Anneal (RTA), etc. Thus, what constitutes a "fault" may vary depending upon the type of workpieces processed and the nature of the processing operation performed in the processing tool 30–80. As utilized herein, the term "fault" may include any undesirable condition associated with the processing tool 30–80 that adversely affects the operation of the processing tool 30–80 or it may include misprocessed wafers.

In accordance with one embodiment, the fault detection system 150 may include a commercially available software package, such as ModelWare, for example, that provides fault detection analysis of the processing tools 30–80. It will be appreciated, however, that other types of commercially available fault detection software may also be used in lieu thereof without departing from the spirit and scope of the present invention.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based on the Advanced Process Control (APC) Framework. CIM (SEMI E81-0699—Provisional Specification for CIM Framework Domain Architecture) and APC (SEMI E93-0999— Provisional Specification for CIM Framework Advanced Process Control Component) specifications are publicly available from SEMI.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Figure 2:
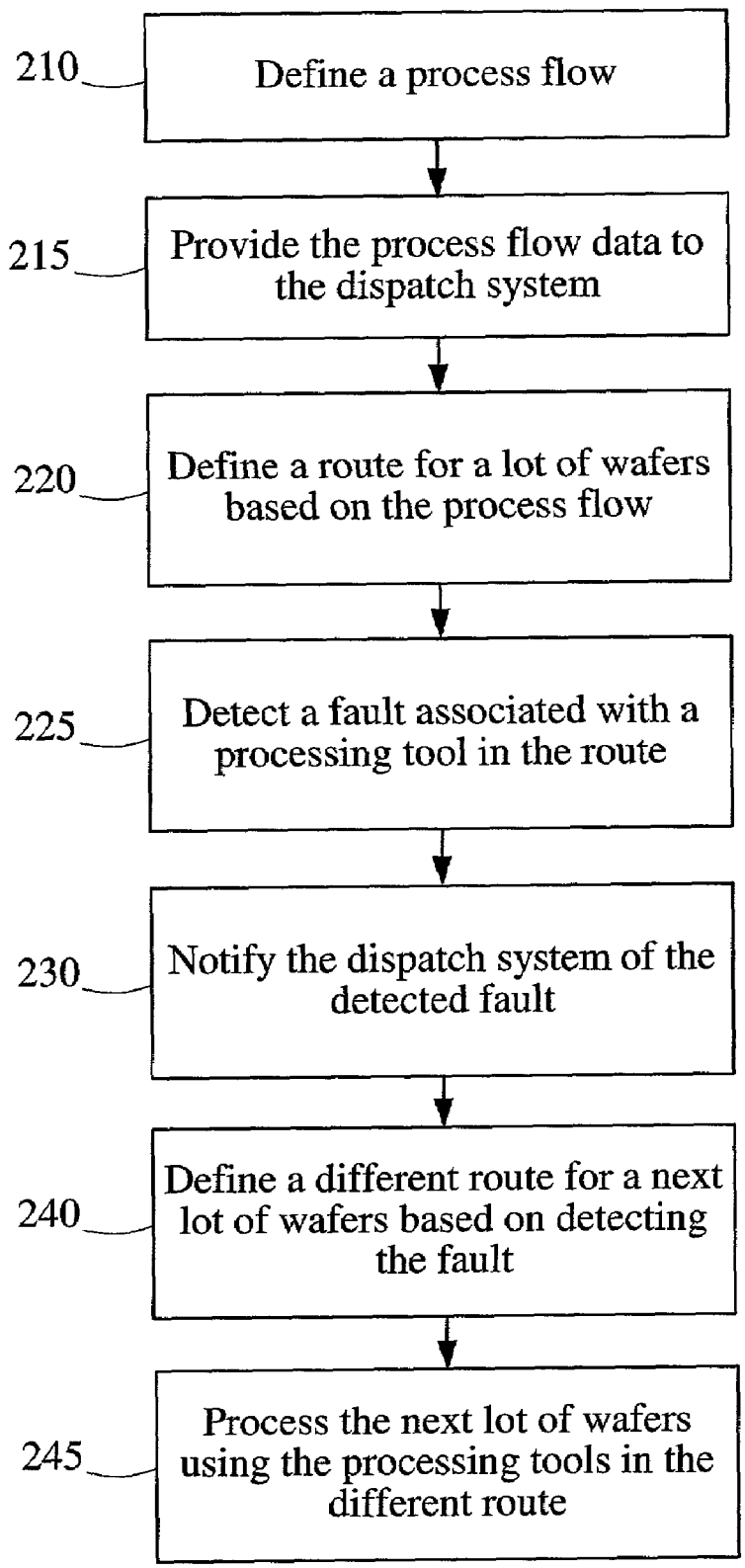
FIG. 2 illustrates a flow diagram of a method that may be implemented in the manufacturing system of FIG. 1, in accordance with one embodiment of the present invention.

Referring now to FIG. 2, a flow diagram of a method that may be implemented in the manufacturing system 10 of FIG. 1 is illustrated, in accordance with one embodiment of the present invention. The MES 90 (see FIG. 1) defines (at 210) a process flow, and provides (at 215) the data associated with the defined process flow (at 210) to the dispatch system 100. The process flow, for example, defines the various types of processes that are to be performed on the wafers in a given order. For example, in one embodiment, a process flow may call for a lot of wafers to be first processed by an implanter tool, then an etching tool, and finally by a polishing tool. In the illustrated embodiment of FIG. 1, for example, one set 84–89 of the processing tools 30–80 may be implanters, another set 84–89 of processing tools 30–80 may be etchers, and yet another set 84–89 of processing tools 30–80 may be polishers.

For the purposes of this discussion, it is herein assumed that the process flow defined (at 210) by the MES 90 calls for performing at least an implanting process and it is further assumed that the processing tools 40A–D in the set 85 represent implanter tools. The dispatch system 100, based on the received process flow data, defines (at 220) a route for processing a lot of wafers. For example, the defined route (at 220) may include performing the implanting process using one of the four processing tools 40A–D, such as the processing tool 40B.

The fault detection system 150 detects (at 225) a fault associated with the processing tool 30–80 in the route defined (at 220) by the MES 90. As described above, various types of faults may be detected using a variety of different methods. The fault detection system 150 may, for example, detect (at 225) a fault associated with the processing tool 40B, assuming that tool is included in the route defined (at 220) by the MES 90. The fault detection system 150 notifies (at 230) the dispatch system 100 of the detected fault.

Based on the fault notification provided by the fault detection system 150, the dispatch system 100 defines (at 240) a different route for processing a next lot of wafers. It may be desirable to define a different route (at 240) for processing the next lot of wafers because the faulty processing tool 30–80 in the original route defined (at 220) may no longer be operating properly. For example, assuming that the defined route (at 220) includes the processing tool 40B of the second set 85 and assuming further that it is the processing tool 40B that is faulty, then the dispatch system 100 may define an alternate route that includes at least one of the other processing tools 40A, 40C, and 40D instead of the processing tool 40B to perform the desired implanting step. Upon defining the different route (at 240), the dispatch system 100 processes (at 245) the next lot of wafers using the processing tool (e.g., 40A, 40C or 40D) in the different route.

Figure 3:
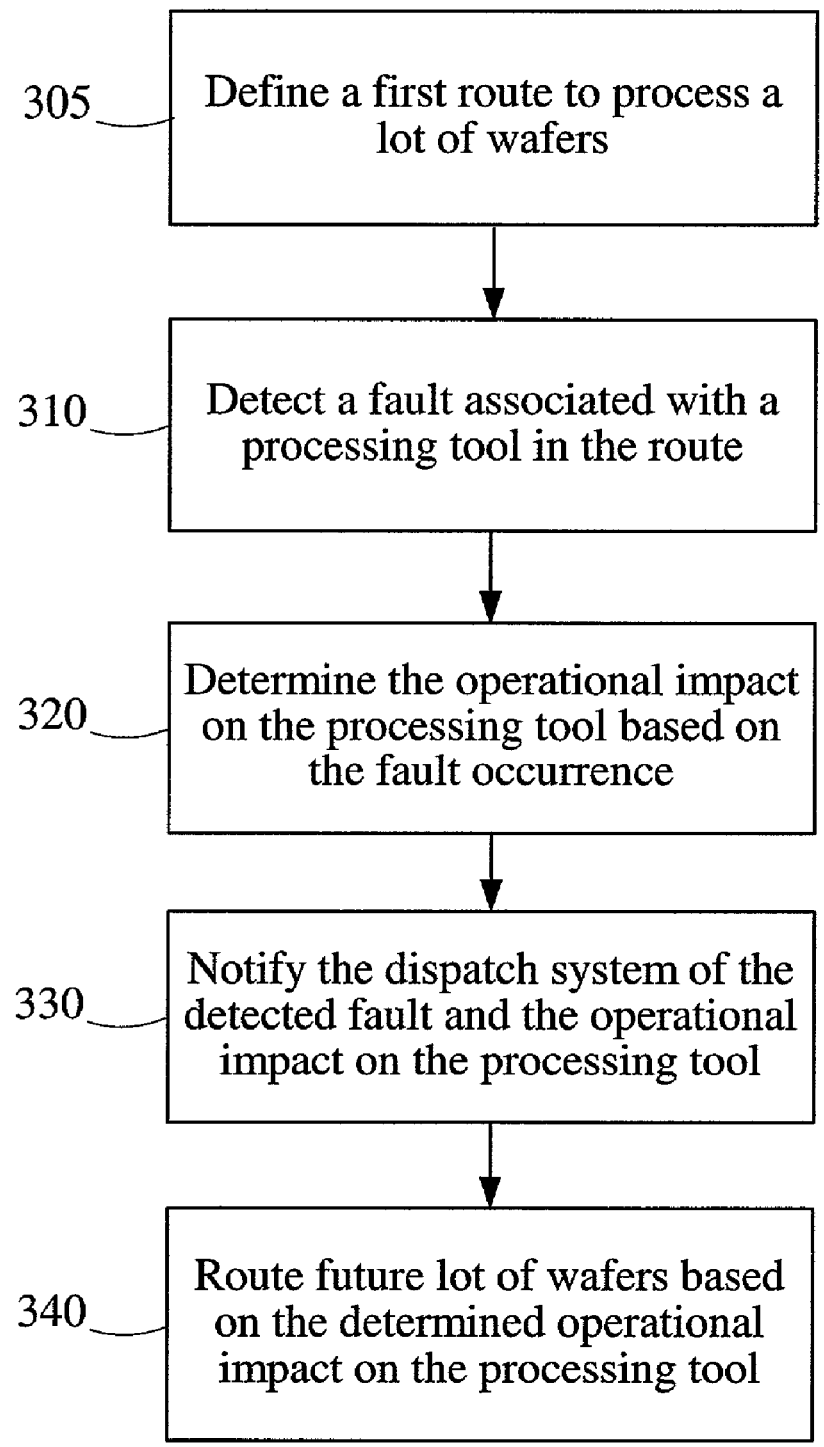
FIG. 3 illustrates a flow diagram of a method that may be implemented in the manufacturing system of FIG. 1, in accordance with one embodiment of the present invention.

Referring now to FIG. 3, a flow diagram of a method that may be implemented in the manufacturing system 10 of FIG. 1 is illustrated, in accordance with one embodiment of the present invention. The dispatch system 100 defines (at 305) a first route for processing a lot of wafers based on the process flow provided by the MES 90. The fault detection system 150 detects (at 310) a fault associated with a processing tool 30–80 that is in the defined first route (at 305). The fault detection system 150 determines (at 320) the operational impact of the fault on the processing tool 30–80. The operational impact on the processing tool 30–80 may vary depending on the nature of the fault. For example, in one embodiment, the processing tool 30-80 may be rendered completely inoperable, if the associated fault is a mechanical or electrical failure of an essential component of the processing tool 30-80. Alternatively, in one embodiment, the fault may not necessarily render the processing tool 30-80 completely inoperable, in which case, the fault may only partially affect the operation of the processing tool 30-80. An example of a fault that may only partially affect the operation of the processing tool 30-80 includes a failure of one of many chambers in the processing tool 30-80. The processing tool 30-80 may still be able to perform limited processing despite the loss of one chamber, for example. Another example of a fault that only partially affects the operation of the processing tool 30-80 may include depletion of a non-essential chemical supply. Similarly, other types of faults may not necessarily render the processing tool 30-80 completely inoperable.

The fault detection system 150 notifies (at 330) the dispatch system 100 of the detected fault (at 330) as well as the operational impact (at 320) of the fault on the processing tool 30-80. In one embodiment, notifying (at 330) the dispatch system 100 of the operational impact on the processing tool 30-80 may include providing the processing capability of that processing tool 30-80 after the occurrence of the fault. Alternatively, notifying (at 330) the dispatch system 100 may include identifying the functions that the processing tool 30-80 is not capable of performing as a result of the fault.

In one embodiment, the dispatch system 100 routes (at 340) the future lot of wafers based on the determined operational impact (at 320) of the detected fault (at 310) on the processing tool 30-80. That is, the dispatch system 100, in one embodiment, routes (at 340) the future lot of wafers according to operational capability of the processing tool 30-80 after the occurrence of the fault. For example, if the processing tool 30-80 that experiences a fault is still able to perform select, limited processes, then the dispatch system 100 may be able to nevertheless utilize that processing tool 30-80 for its limited purpose. In such a case, the dispatch system 100 may re-route only those wafers that require processing that can no longer be performed by the processing tool 30-80 that experiences the fault.

Thus, in accordance with one or more embodiments of the present invention, the dispatch system 100 is capable of re-routing one or more wafers based on detecting a fault associated with a processing tool 30-80. In one embodiment, only selected wafers may be re-routed depending on the functional capabilities or incapabilities of the processing tool 30-80 after the occurrence of the fault. In this manner, the dispatch system 100 may be able to reduce the interruption of the process flow in case one or more processing tools 30-80 in the manufacturing system 10 experience a fault.

The storage unit 145 (see FIG. 1) referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
    routing a first workpiece to a first processing tool identified by a dispatch system;
    detecting a fault condition associated with the first processing tool;
    notifying the dispatch system of the detected fault condition; and
    routing a second workpiece to a second processing tool in response to the dispatch system being notified of the fault condition.

2. The method of claim 1, further comprising determining a type of fault condition associated with the first processing tool and routing the second workpiece to the second processing tool based on the type of fault condition.

3. The method of claim 1, wherein routing the second workpiece comprises routing a second group of workpieces to the second processing tool.

4. The method of claim 1, further comprising processing the second workpiece using the second processing tool.

5. The method of claim 1, wherein detecting the fault condition comprises detecting the fault condition based on metrology data associated with one or more wafers processed by the first processing tool.

6. The method of claim 1, wherein routing the second workpiece to the second processing tool is based on an operational impact of the fault condition on at least one of the first and second processing tools.

7. The method of claim 1, wherein detecting the fault condition comprises detecting at least one of a process fault condition and an operational fault condition associated with the processing tool.

8. A method, comprising:
    routing a first workpiece to a first processing tool identified by a dispatch system;
    detecting a fault condition associated with the first processing tool;
    notifying the dispatch system of the detected fault condition;
    routing a second workpiece to a second processing tool in response to the dispatch system being notified of the fault condition; and
    wherein detecting the fault condition comprises:
        receiving operational data from the first processing tool associated with the manufacture of the first workpiece; and
        comparing the received operational data with a previously established fault model data.

9. An apparatus, comprising:
    an interface; and
    a control unit communicatively coupled to the interface, the control unit adapted to:

define a first route for processing a workpiece, wherein the first route includes a first processing tool;
receive a fault notification from the interface regarding a fault associated with the first processing tool;
define a second route for processing a next workpiece based on receiving the fault notification, wherein the second route includes a processing tool that is different from the first processing tool; and
route the next workpiece in accordance with the second route.

10. The apparatus of claim 9, wherein the control unit is further adapted to determine a type of fault that is detected with the first processing tool.

11. The apparatus of claim 10, wherein the control unit is further adapted to define the second route based on the type of fault that is detected with the first processing tool.

12. The apparatus of claim 9, wherein the control unit is adapted to route the next workpiece based on an operational impact of the fault condition on at least one of the tools.

13. The apparatus of claim 9, wherein the control unit is adapted to receive the fault notification based on the fault that is detected by analyzing metrology data.

14. The apparatus of claim 9, wherein the control unit is adapted to receive the fault notification based on detection of at least one of a process fault and an operational fault associated with the first processing tool.

15. The apparatus of claim 9, further comprising a second control unit that is adapted to receive operational data from the first processing tool associated with the manufacture of the workpiece and comparing the received operational data with a previously established fault model data.

16. An apparatus, comprising:
means for muting a workpiece to a first processing tool identified by a dispatch system;
means for detecting a fault condition associated with the first processing tool;
means for notifying the dispatch system of the detected fault condition; and
means for routing a next workpiece to a second processing tool in response to the dispatch system being notified of the fault condition.

17. An article comprising one or more machine-readable instructions that when executed enable a processor to:
route a workpiece to a first processing tool identified by a dispatch system;
detect a fault condition associated with the first processing tool;
notify the dispatch system of the detected fault condition; and
route a next workpiece to a second processing tool in response to the dispatch system being notified of the fault condition.

18. The article of claim 17, wherein the instructions when executed enable the processor to determine a type of fault condition associated with the first processing tool and route the next workpiece to the second processing tool based on the type of fault condition.

19. The article of claim 17, wherein the instructions when executed enable the processor to route the next workpiece comprises routing a next group of workpieces to the second processing tool.

20. The article of claim 17, wherein the instructions when executed enable the processor to detect the fault comprises receiving operational data from the first processing tool associated with the manufacture of the workpiece and comparing the received operational data with a previously established fault model data.

21. A system, comprising:
a first processing tool and a second processing tool that are each capable of processing one or more semiconductor devices; and
a dispatch unit adapted to:
define a first route for processing a first group of semiconductor devices, wherein the first route includes the first processing tool;
receive a fault notification regarding a fault that is detected with the first processing tool;
define a second route for processing a second group of semiconductor devices based on receiving the fault notification, wherein the second route includes the second processing tool; and
route the second group of semiconductor devices in accordance with the second route.

22. The system of claim 21, further comprising an advanced process control framework coupled between the processing tool and the dispatch system.

* * * * *